(12) United States Patent  
Kerrebrock et al.

(10) Patent No.: US 7,137,465 B1  
(45) Date of Patent: Nov. 21, 2006

(54) CRAWLER DEVICE

(75) Inventors: Peter A. Kerrebrock, Hingham, MA (US); Jamie M. Anderson, Watertown, MA (US); William W. McFarland, Jr., Watertown, MA (US); Thomas G. Ogrodnik, Cohasset, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 151 days.

(21) Appl. No.: 10/677,206

(22) Filed: Oct. 2, 2003

Related U.S. Application Data

(60) Provisional application No. 60/415,347, filed on Oct. 2, 2002.

(51) Int. Cl.  
*B62D 61/10* (2006.01)

(52) U.S. Cl. .................................. 180/22; 165/11.2

(58) Field of Classification Search ............ 180/22, 180/23, 24, 24.04, 24.08, 317, 319; 165/11.2  
See application file for complete search history.

(56) References Cited

U.S. PATENT DOCUMENTS

| | | | | |
|---|---|---|---|---|
| 4,852,391 A | * | 8/1989 | Ruch et al. ............... 73/40.5 R |
| 4,986,314 A | * | 1/1991 | Himmler ..................... 138/97 |
| 5,197,540 A | * | 3/1993 | Yagi et al. ................. 166/55.8 |
| 5,284,096 A | * | 2/1994 | Pelrine et al. ........... 104/138.2 |
| 5,878,783 A | * | 3/1999 | Smart ......................... 138/93 |
| 6,084,402 A | * | 7/2000 | Smart ......................... 324/220 |
| 6,107,795 A | * | 8/2000 | Smart ......................... 324/220 |
| 6,206,491 B1 | | 3/2001 | Hisamatsu ................. 305/103 |
| 6,334,496 B1 | | 1/2002 | Hiraki et al. ............... 180/9.5 |
| 6,450,104 B1 | * | 9/2002 | Grant et al. ............. 104/138.2 |
| 6,601,664 B1 | | 8/2003 | Hiraki et al. ............... 180/9.5 |
| 6,917,176 B1 | * | 7/2005 | Schempf et al. ....... 318/568.11 |

* cited by examiner

*Primary Examiner*—Paul N. Dickson  
*Assistant Examiner*—Drew J. Brown  
(74) *Attorney, Agent, or Firm*—Mark G. Lappin; Foley & Lardner LLP

(57) ABSTRACT

A crawler device for traversing in a confined environment, searching victims or inspecting defections, comprises an elongated flexible drive shaft extending along a central axis between a proximal end and a distal end, a motor operatively connected to the drive shaft for turning the drive shaft, and a plurality of segments disposed over the drive shaft. Any two adjacent segments are joined by an articulate joint. Each segment has a wheel assembly including drive wheels. At least two segments further include a gear assembly operatively connecting the wheel assembly to the drive shaft. Turning the drive shaft provides distributed traction force to the drive wheels of the at least two segments, and thereby drives the crawler device.

60 Claims, 12 Drawing Sheets

CRAWLER DEVICE

CROSS-REFERENCE TO RELATED APPLICATION

This application claims the benefit of priority from U.S. Provisional Application Ser. No. 60/415,347, filed Oct. 2, 2002.

FIELD OF THE INVENTION

The invention generally relates to a crawler device, more specifically, to a wheeled crawler device for traversing in confined circumstances.

BACKGROUND OF THE INVENTION

Crawler devices have been used for carrying camera devices, microphones, nutrients, and medications to confined space, or hazardous space, such as conduits, pipes, rubble of collapsed structures (buildings, highways, etc.). In the prior art, an elongated, articulated so called "micro-tank" has been used to inspect pipes and search for victims in earthquake rubble. The micro-tank incorporates a single unit or a plurality of repeating units connected by joints. Each unit has its own drive motor which drives oval tracks through a gear mechanism. The unit may be powered by batteries carried on the unit and controlled remotely by an operator, or powered and controlled through cables embedded in a tether connected to the last unit of the micro-tank.

Tracked tank design has been successfully used for travel over relatively smooth terrain, but it fails to traverse extremely rugged terrain or relatively large obstacles, for example, as might be encountered in the rubble of collapsed buildings. Inspired by the ability of biological snakes to traverse a wide variety of terrain, ranging from arid desert to tropical jungle, as well as swimming in rivers, and the snakes' capability of overcoming relatively large obstacles, scientists have developed many kinds of snake-like robots imitating the movement and physiological structure of snakes. One type of crawler design incorporates a plurality of segments that are connected by articulated joints. The head segment carries sensors and the tail segment carries batteries. Each segment is built with its own motor to drive its legs or wheels. Some snake-like robots move forward by traveling horizontal waves of undulation down to the length of the robot, imitating sidewinding movement of biological snakes. Some snake-like robots move by driving wheels without any imitation of snake-like locomotion.

Such conventional devices tend to either lack mobility or maneuverability for efficient operation or they are highly complicated that make them expensive and difficult to operate and maintain. Also, conventional devices emphasize on autonomy of the device and overlook needs of victims confined in the rubble. Therefore, there is a need for a device capable of traversing through rough areas, for example, the rubble of collapsed structures. Such devices should have high mobility and maneuverability, and be inexpensive to manufacture and maintain.

SUMMARY OF THE INVENTION

The present invention provides a crawler device for traversing rugged terrain in a confined environment, for example, as may be necessary in searching for victims in collapsed buildings, or inspecting for defects in pipe lines. The crawler device comprises an elongated flexible drive shaft extending along a central axis between a proximal end and a distal end, a motor operatively connected to the drive shaft for rotating the drive shaft about its central axis, and a plurality of linearly interconnected segments disposed along the drive shaft. The segments are preferably joined by articulated joints, and in a most preferred form, universal joints. Each segment has a wheel assembly including drive wheels rotatable about axes transverse to the central axis. At least two segments further include a drive coupling assembly, for example, including gears or drive belts, operatively connecting the wheel assembly to the drive shaft. Rotating the drive shaft provides a distributed traction force to the drive wheels of the at least two segments, and thereby driving the crawler device.

In one preferred embodiment, each segment of the crawler device has two drive wheels disposed on the two opposite sides of the segment. In another preferred embodiment, each segment of the crawler device has two sets of drive wheels disposed at two opposite sides of the segment, each set having two wheels. The two sets of wheels of one segment are positioned along a first axis, and the two sets of wheels of an adjacent segment are positioned along a second axis that is perpendicular with the first axis, so that each side of the crawler device has drive wheels that can propel the crawler device.

In another preferred embodiment, the drive shaft includes successive sections joined by universal joints. Preferably, the sections of the drive shaft are joined at the point where the two adjacent segments are joined to allow the crawler device to be bent at the joint points.

In one form, a tether is connected to a proximal end of the crawler device. The tether is preferably semi-rigid, so that an operator can pull and push the crawler device using the tether, supplementing the motive force provided by the motor-driven drive wheels. Cables for transmitting control signals and electricity for supplying power to the motor may be embedded within the tether, passing through the tether to an external power source and a control system.

In one preferred embodiment, the motor is positioned remote from the crawler device and is operatively coupled to the drive shaft by way of a drive cable extending along the tether.

The crawler device may be steered by two pairs of parallel steering wires. In one preferred embodiment, the crawler device has steering wires extending along the central axis from the proximal end to a head segment at a distal end of the crawler device. The wires of the respective pairs lie in orthogonal planes. The operator may selectively tension or relax in opposite directions the wires of each pair, thereby providing a selectively applied two-axis control of the orientation (about a pair of orthogonal axis, transverse to the central axis) of the head segment. The directional control of the head segment effects steering of the distal end of the crawler device. The steering wires may extend through the crawler device and be connected to a steering end effector, for example, a steering motor at the proximal end, where the steering can be effected by way of a remote controlled steering motor.

The drive wheels of the crawler device preferably have a conical shape and each wheel has a circumferential tread. In one preferred embodiment, the wheel assembly includes four sets of drive wheels disposed at four sides of each segment, each set including two wheels. Two adjacent wheels from two adjacent sides of the segment are installed close to each other, so that the treads of these two wheels can reach the surface that is oblique to the crawler device.

In another preferred embodiment, the crawler device further includes a video camera and a light assembly mounted on the head segment. The video camera and the light assembly allow the operator to visually inspect the environment of the distal end of the crawler device, for example, inside of the rubble of a collapsed structure, permitting searching for victims in the rubble, and also to enable image guided steering of the crawler device into desired directions. A control system is connected to the crawler device for controlling the crawler device. The control system is connected to the video camera and motor. The control system includes a display means, preferably a computer, for displaying video images received from the video camera. The control system may also include a control joystick for controlling the drive motor and for steering the crawler device.

The crawler device further includes an orientation sensor, preferably a gravity sensor. The orientation sensor is connected to the control system, which includes a processing system programmed to orientate images received from the video camera and display the orientated images on the screen of the computer with an upright view based on signals received from the orientation sensor.

In one embodiment, the crawler device further includes infrared sensors, which for example are useful for searching for victims in rubble of a collapsed structure. The crawler device may further include microphones and speakers to allow an operator to communicate with a victim found in the rubble of collapsed structures.

Another embodiment of the present invention includes a plurality crawler units inter-connected in tandem by tethers. Each crawler unit includes its own common drive shaft, a motor for driving the common drive shaft, and a plurality wheeled segments disposed over the drive shaft. Each unit is capable of dragging the part of tether which is connected at a distal end of the crawler unit. The multiple crawler units embodiment makes the crawler device capable of dragging long tethers, and is therefore capable of going deeper into a rugged environment, for example, the rubble of a collapsed structure or an extensive pipe system.

DETAILED DESCRIPTION OF THE PREFERRED EMBODIMENTS

Figure 1:
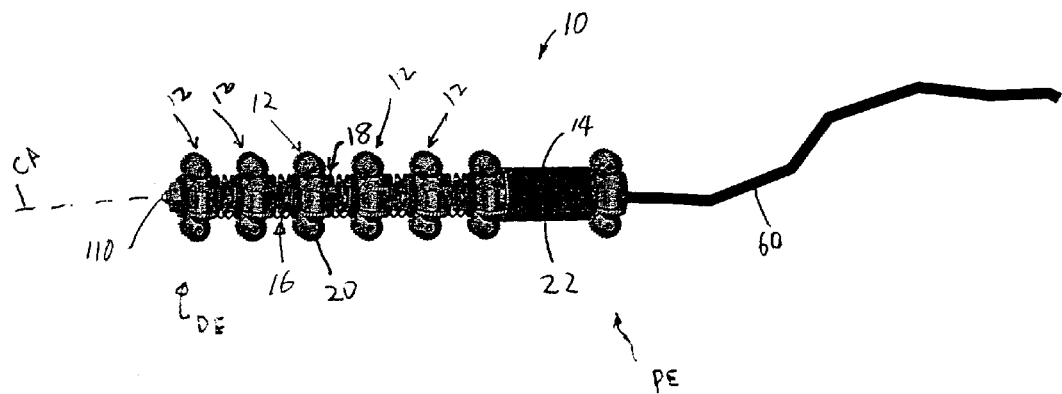
FIG. 1 is a side view of a crawler device according to the present invention.

For the purposes of promoting an understanding of the present invention, reference will now be made to the embodiments illustrated in the drawings and specific language will be used to describe the same.

FIG. 1 illustrates a preferred embodiment of a crawler device 10 in accordance with the present invention. As shown in FIG. 1, the crawler device 10 includes a plurality of repeating segments 12 and a motor 14 disposed over one common drive shaft 16, which extends along a curvilinear central axis CA (which is illustrated as straight in FIG. 1 and curved in FIG. 2). Each segment 12 has its own wheel assembly 18 which includes a plurality of drive wheels 20. The motor 14 is disposed within a drive unit (housing) 22, which is positioned near or at a proximal end of the drive shaft 16.

Figure 2:
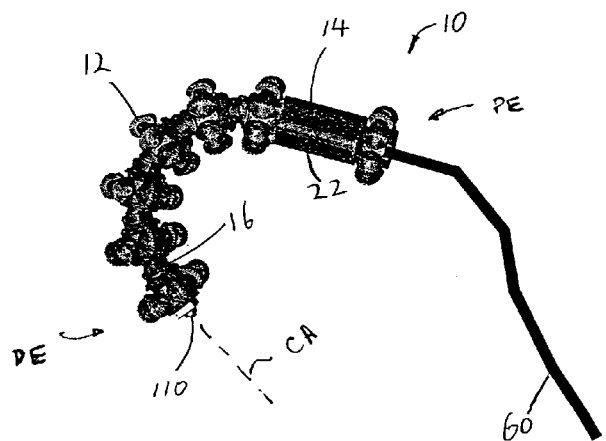
FIG. 2 is a perspective view of a crawler device according to the present invention.

The crawler device 10 extends along axis CA between a proximal end PE and a distal end DE. The repeating segments 12 of the crawler device 10 are preferably joined pairwise by articulated joints or ball and socket joints to allow the crawler device to curve in any directions, for example, as shown in FIG. 2. In the preferred embodiment shown in FIGS. 1 and 2, each segment 12 has four sets of wheels disposed on four sides of the segment, each set including two drive wheels 20, which are rotatable about a wheel axis transverse to the central axis CA at that segment.

Figure 3:
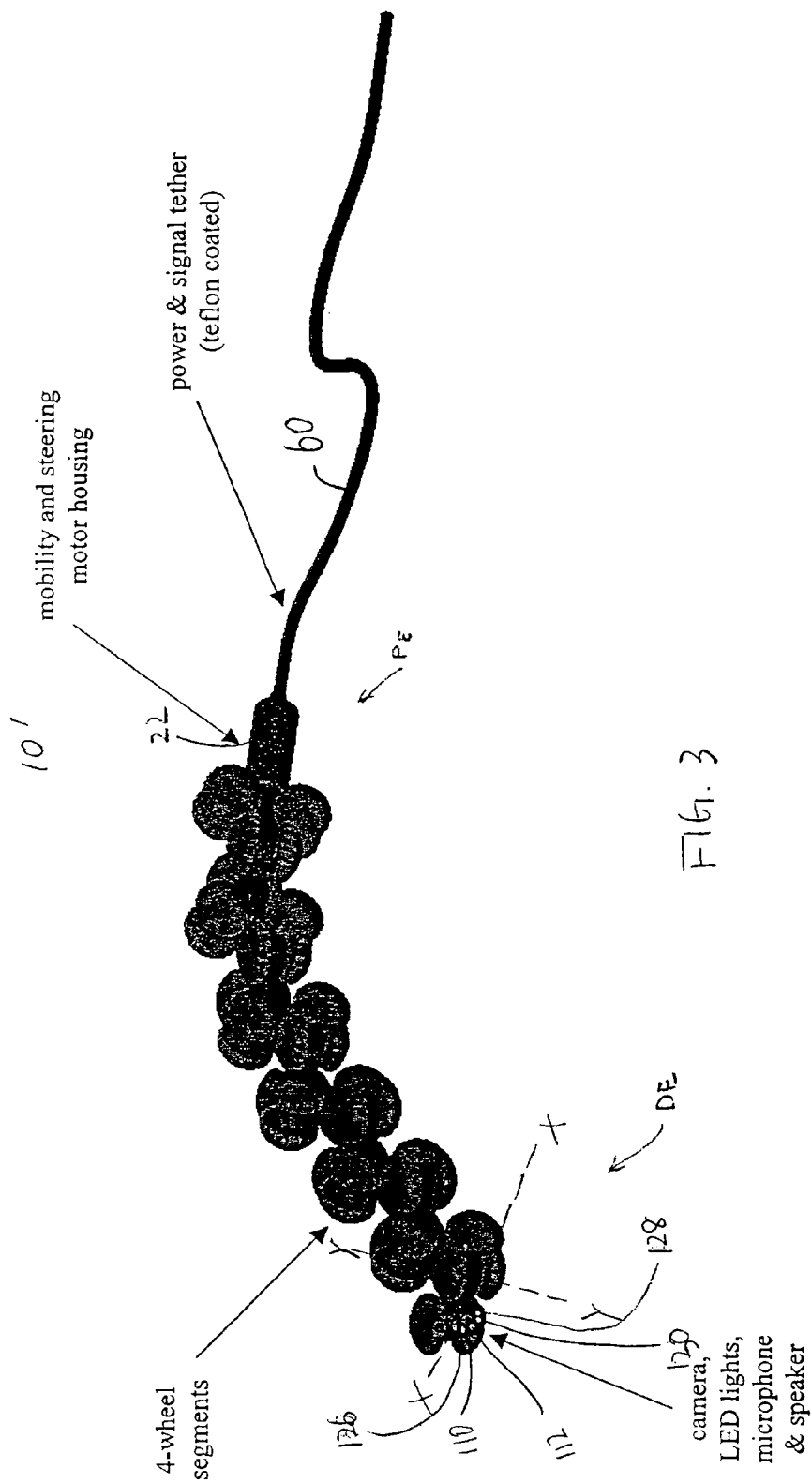
FIG. 3 is a perspective view of another embodiment of the crawler device according to the present invention.
Figure 4:
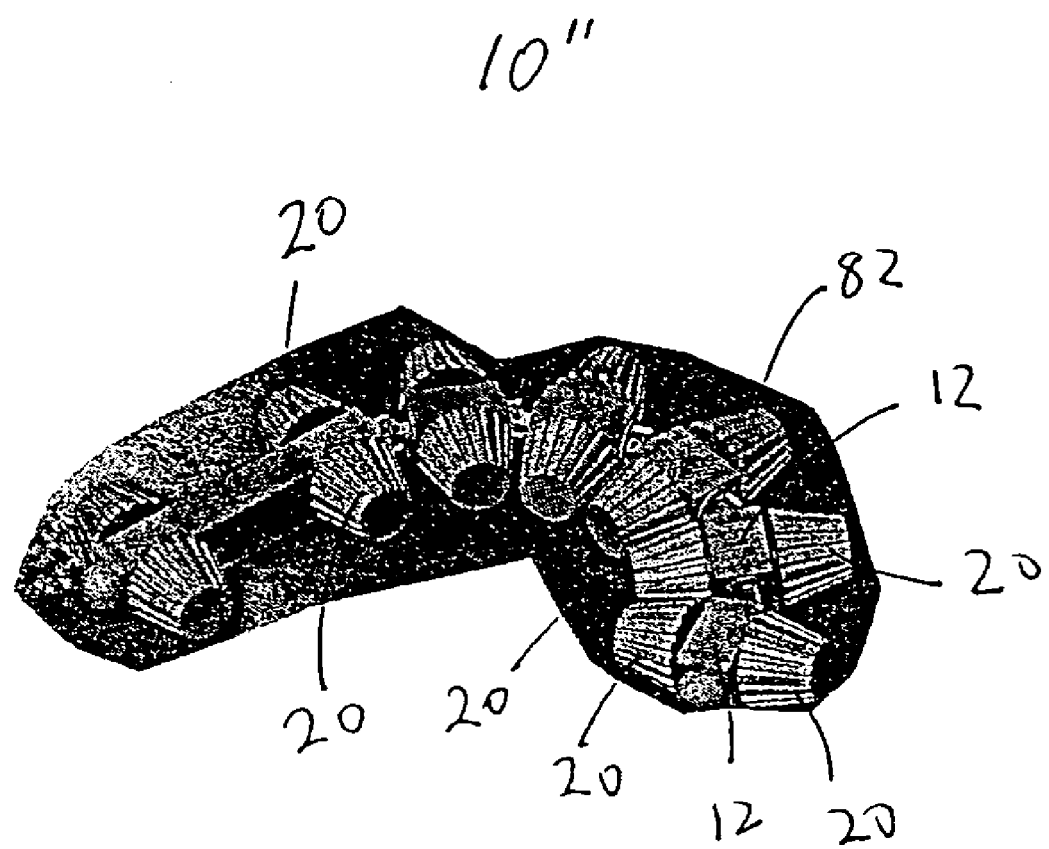
FIG. 4 is perspective view of another embodiment of the crawler device according to the present invention.

In another preferred embodiment, as shown in FIG. 3, each segment 12 of the crawler device 10' has two sets of wheels mounted on the two opposite sides of the segment, each set including two drive wheels 20. The two sets of wheels are positioned along an axis X—X in one segment, and, in an adjacent segment, the two sets of wheels are positioned along an axis Y—Y. Preferably, axes X—X and Y—Y are perpendicular to each other, so that each side of the crawler device has drive wheels that can propel the crawler device 10 across rugged surface. FIG. 4 shows a flat form embodiment 10" of the present invention. As shown in FIG. 4, each segment of the crawler device includes two drive wheels 20 disposed on two opposite sides of the segment 12. The drive unit 22 may also have drive wheels 20 disposed on two opposite sides of the drive unit.

Figure 5:
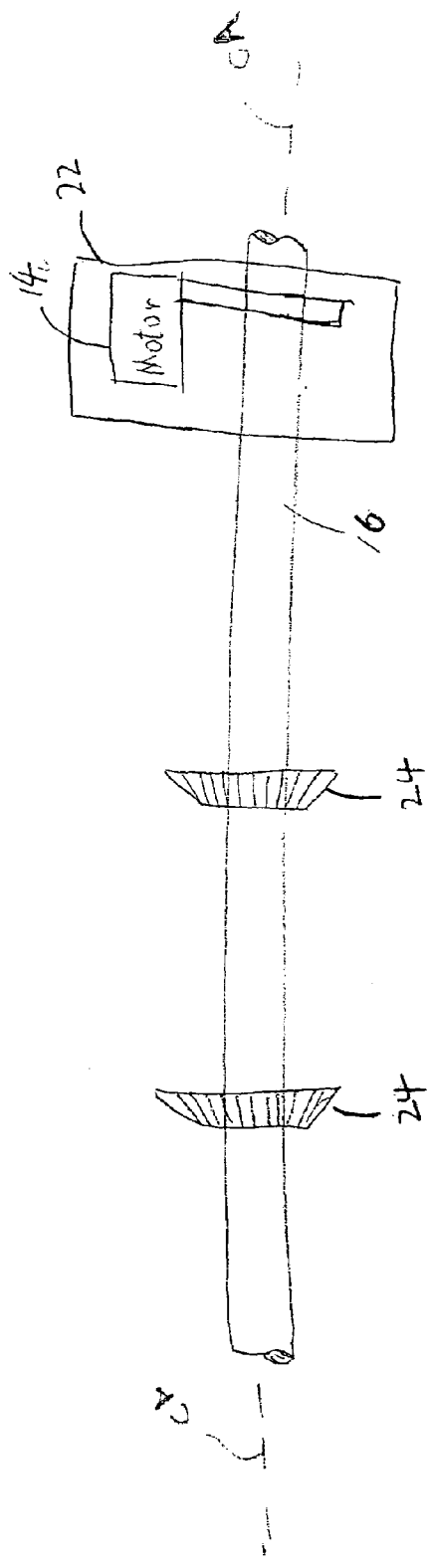
FIG. 5 is a schematic view of a drive shaft and a motor according to one embodiment of the present invention.
Figure 5A:
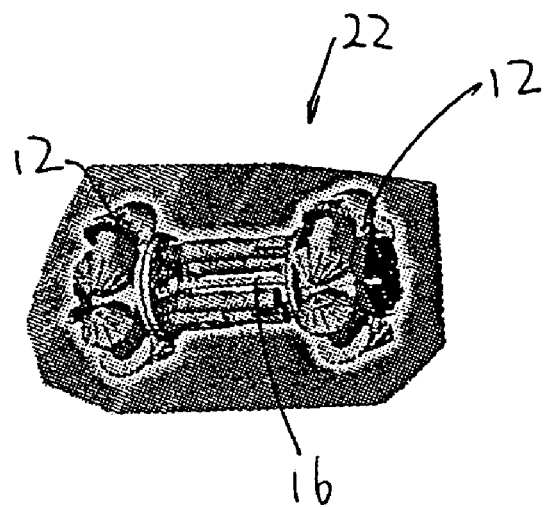
FIG. 5A is a perspective, cutaway view of a drive unit according to the embodiment of FIG. 5.
Figure 5B:
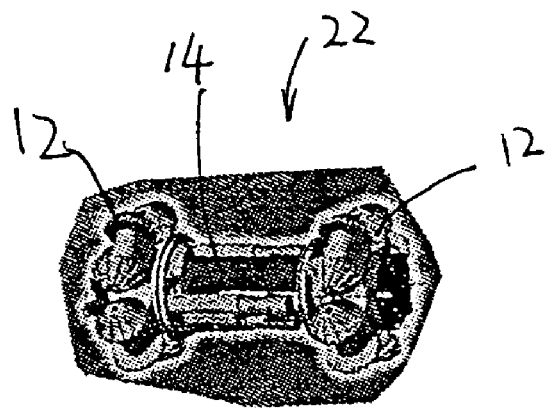
FIG. 5B is a perspective, cutaway view of the drive unit housing the motor according to the embodiment of FIG. 5.

FIG. 5 is a schematic view of the motor 14 and drive shaft 16 of one preferred embodiment of the present invention. In one embodiment, the drive unit 22 is disposed between and is joined to two segments near the proximal end of the crawler device 10 (FIGS. 1 and 2). In another embodiment, the motor is disposed at the proximal end of the crawler device 10' (FIG. 3). As seen in FIG. 5A and FIG. 5B, inside the drive unit 22, the motor 14 is operatively connected to the drive shaft 16 and may selectively drive the draft shaft 16 in clockwise or counterclockwise rotational motion about the central axis CA. The wheel assemblies are coupled to the drive shaft 16, so that rotational motion of the drive shaft 16 drives the wheels to rotate with their peripheral portions, providing a distributed (along axis CA) traction, which drives the crawler device 10 (or 10', 10") forward or backward. The motor may be an electric, hydraulic or pneumatic motor, preferably an electric motor. The drive shaft 16 may be flexible or semi-flexible. In the illustrate embodiment, two bevel gears 24 are mounted on the drive shaft 16 for providing distributed traction to at least two segments. In one preferred form, each segment is provided with an associated bevel gear 24 mounted on the drive shaft, and turning the drive shaft drives all the drive wheels of all the segments. In another form, there may be only two or more bevel gears on the shaft, driving two or more segments.

Figure 6:
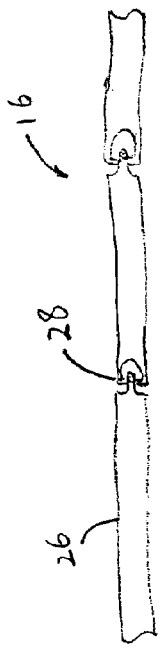
FIG. 6 is schematic view of a drive shaft according to another embodiment of the present invention.

FIG. 6 shows another preferred embodiment of the shaft 16, in which the shaft has multiple sections 26 connected by universal joints 28. Preferably, the two shaft sections 26 are joined at the point where the two adjacent segments 12 are joined, so that the crawler device 10 can be bent at the common joint points where the segments and the sections of the shaft are joined.

Figure 7:
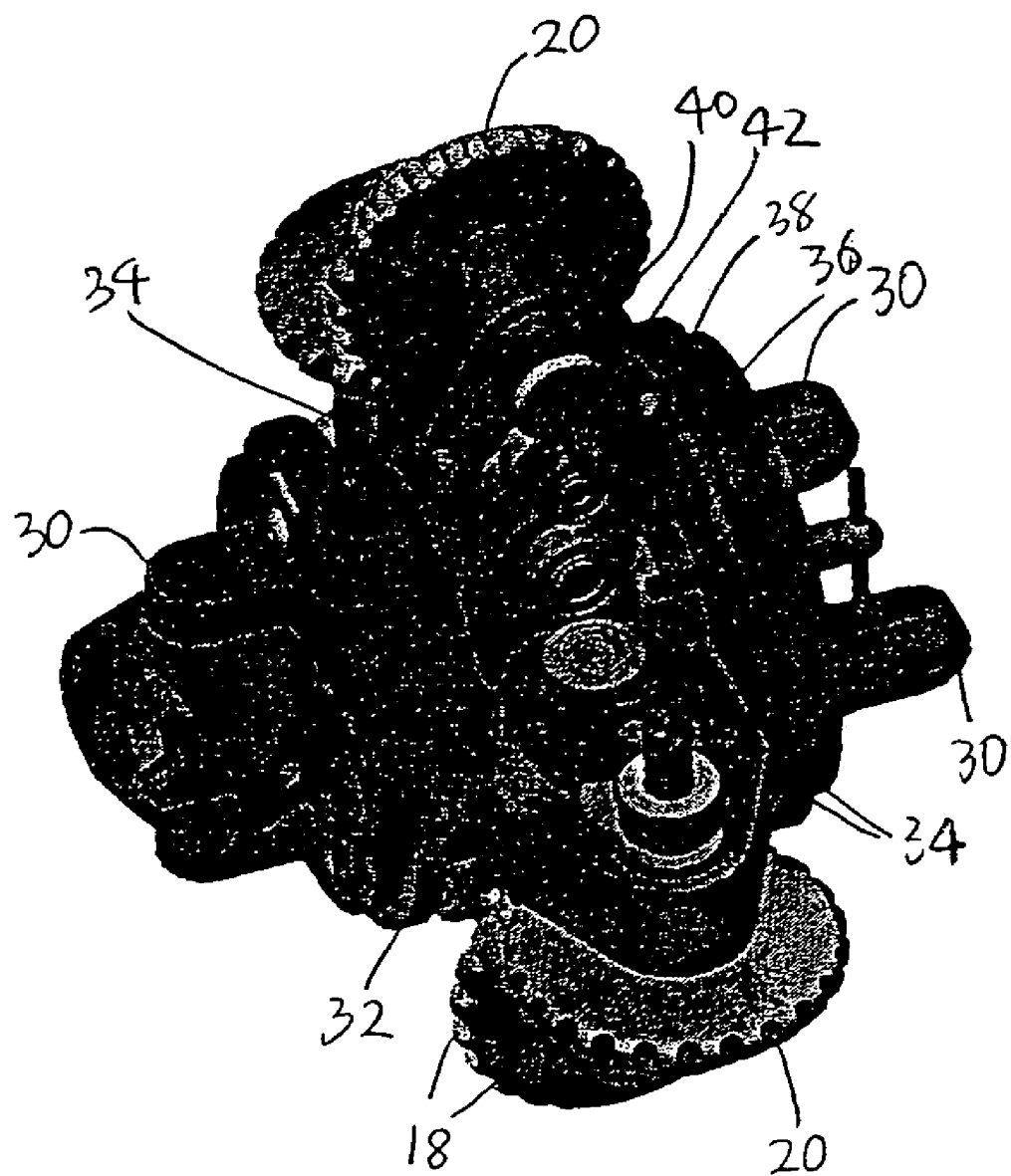
FIG. 7 is a perspective, cutaway view of a segment according to one embodiment of the present invention.

FIG. 7 is a perspective view of one segment partially cut-away to reveal internal components thereof. Each segment includes joints 30, preferably articulated joints, which connect the segment with another adjacent segment. At least two segments further include a drive coupling assembly 32, preferably a gear assembly, operatively connecting the shaft 16 and the wheel assembly 18. The gear assembly 32 engages with the bevel gear 24 on the shaft 16 to transfer the rotary motion of the shaft 16 to the drive wheels 20. In the preferred embodiment shown in FIG. 1 and FIG. 2, the wheel assembly 18 has four sets of wheels, each set including two wheels 20. Accordingly the gear assembly 32 includes four sets of gear trains 34, driving the four sets of drive wheels 20. Each set of the gear train 34 includes a bevel gear 36 engaging with the bevel gear 24 for transferring the motion of the shaft 16 to the wheels 20. The gear train 34 further includes a gear 38 connecting with a gear 40 of the wheel assembly 18. The gear 40 has a common axle 42 with the drive wheels 20. The gear train 34 and the gear 40 provide a gear reduction to increase the torque at the drive wheels 20. Through the bevel gear 24 on the drive shaft 16, the gear train 34, and the gear 40 of the wheel assembly, the rotation of the drive shaft 16 is transferred to the drive wheels 20, turning the drive wheels.

The crawler device 10 further includes a tether 60, which is connected to the last segment (FIGS. 1 and 2). In another embodiment shown in FIG. 3, the tether is connected to the drive unit 22. The tether is preferably semi-rigid, so that an operator may pull and push the crawler device by applying force to a proximal end of the tether 60. A cable for transmitting electricity to supply power to the motor from an external source is embedded within the tether. Other cables for transmitting signals between the motor, or a head segment which carries sensors, and a user control end or a control system may also be embedded within the tether. The crawler device 10 may further include a tube extending from the distal end DE of the crawler device along the crawler device and the tether 60 to a user control end. The tube is adapted for transmitting air (eg. $O_2$), fluid (eg. water), nutrient, and/or medicament solutions.

Figure 8:
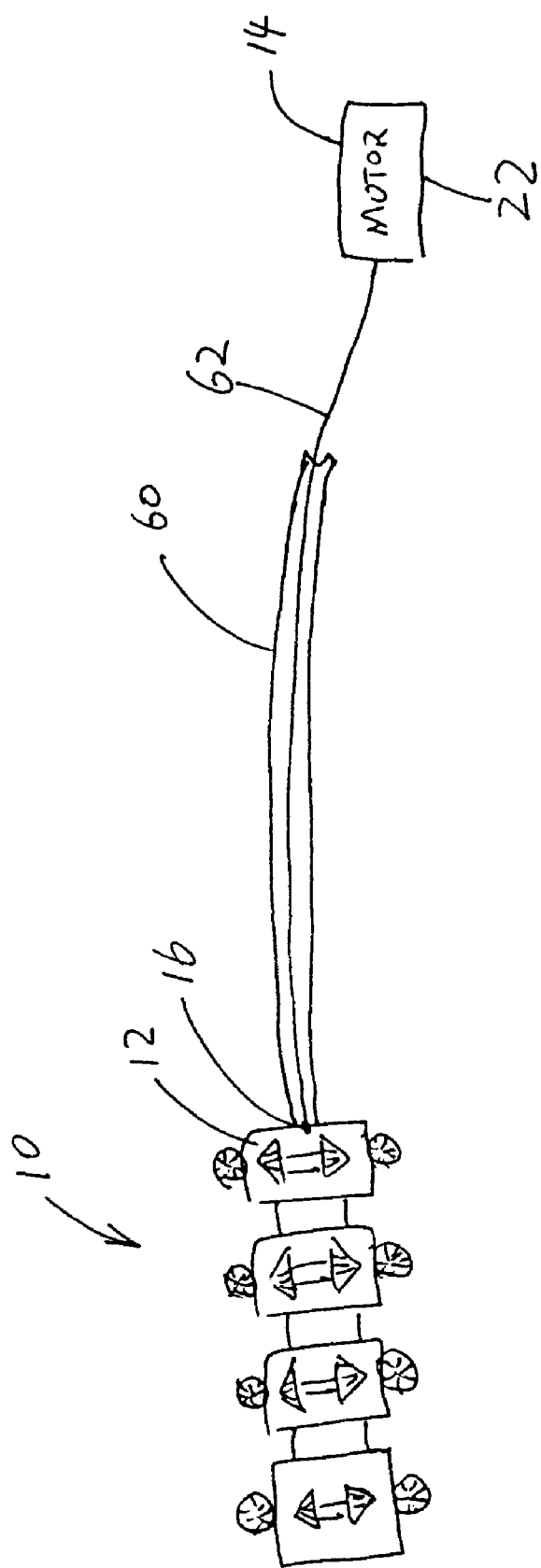
FIG. 8 is a schematic view of another embodiment of the present invention.

FIG. 8 shows another preferred embodiment of the present invention, in which the motor 14 is disposed at the user control end which is remote from the crawler 10. The motor 14 is operatively coupled to the drive shaft 16 by way of a drive cable 62 which extends along the tether 60.

Figure 9:
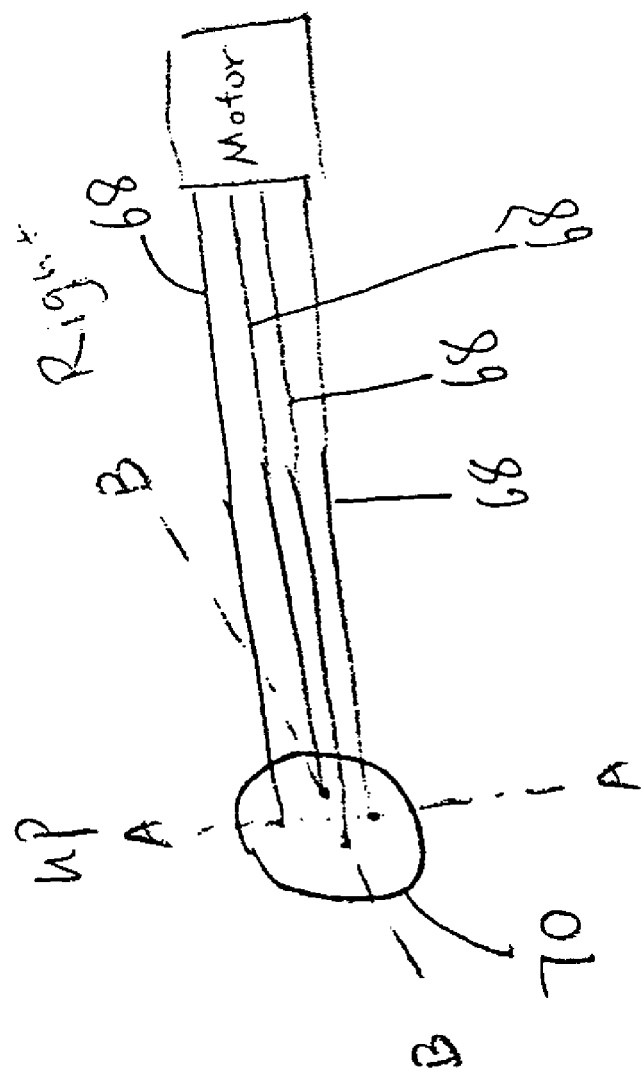
FIG. 9 is a schematic view of one embodiment having steering wires according to one embodiment of the present invention.

The crawler device may be steered by two pairs of parallel steering wires. In one preferred embodiment, the crawler device has steering wires extending along the central axis CA from the proximal end to a head segment 70 at the distal end of the crawler device. The wires of the respective pairs lie in orthogonal planes. The operator may selectively tension or relax in opposite directions the wires of each pair, thereby providing a selectively applied two-axis control of the orientation (about a pair of orthogonal axis, transverse to the central axis) of the head segment. The directional control of the head segment effects steering of the distal end of the crawler device. As shown in FIG. 9, two pairs of internal steering wires 68 extend from the head segment 70 at the distal end DE of the crawler device 10. In one preferred embodiment, the four internal steering wires 68 are parallel to and equally spaced from the drive shaft 16. The four internal steering wires 68 are connected to the head segment 70 at four points. Two opposite points define a steering axis A—A, and the other two define another steering axis B—B. The axes A—A and B—B are substantially perpendicular to each other, and both of them are perpendicular to the drive shaft 16. Selectively tensioning or relaxing the steering wires 68 may cause the crawler device to curve and to be steered in a desired direction. The steering wires may extend through the crawler device and connected to the motor 14, and can be tensioned or relaxed by the motor 14. In another embodiment, the crawler device may further include a steering end effector, preferably another motor to control the steering wires. The steering wires may also extend through the tether 60 to the user control end and is controlled by an operator or a control system at the user control end.

Figure 10:
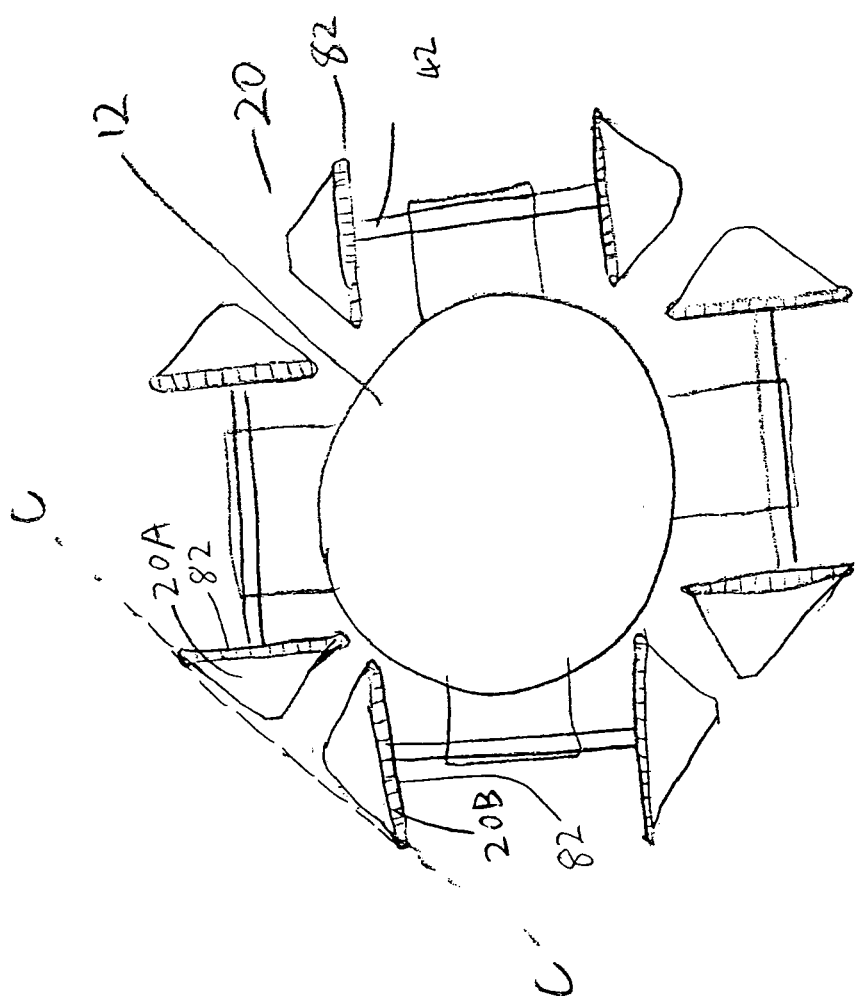
FIG. 10 is an elevation view of one segment with four sets of wheels according to one embodiment of the present invention.

As shown in FIG. 10, the two drive wheels of one set are connected by the common axle 42. The drive wheels 20 preferably have a conical shape. Each wheel includes a circumferential tread 82 for traction. The circumferential tread 82 may extend throughout the oblique surface of the conical shaped drive wheel, as seen in FIG. 4. In one embodiment, two adjacent wheels from two different sets, for example 20A and 20B in FIG. 10, are installed close to each other, and the treads 82 on these wheels can reach the surface oblique to the crawler device, so that the wheels can crawl on the oblique surface (as indicated by C—C in FIG. 10). The conical shape design of the wheels also aids the crawler device to crawl on an inner surface of a conduit.

Figure 11:
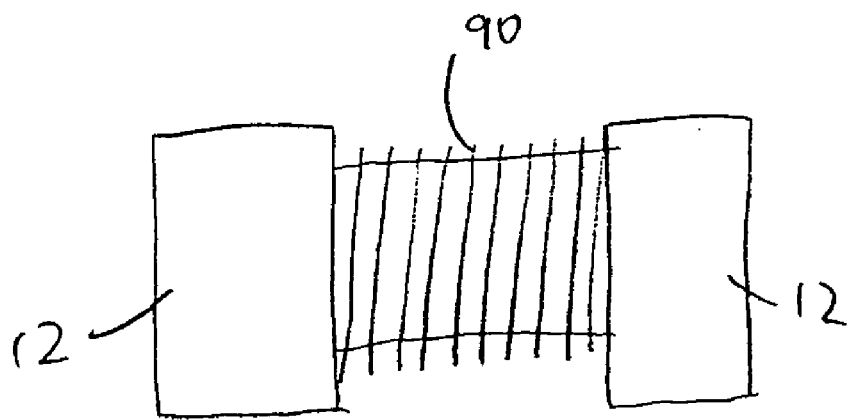
FIG. 11 is a schematic view of a spring disposed between two segments according to one embodiment of the present invention.
Figure 12:
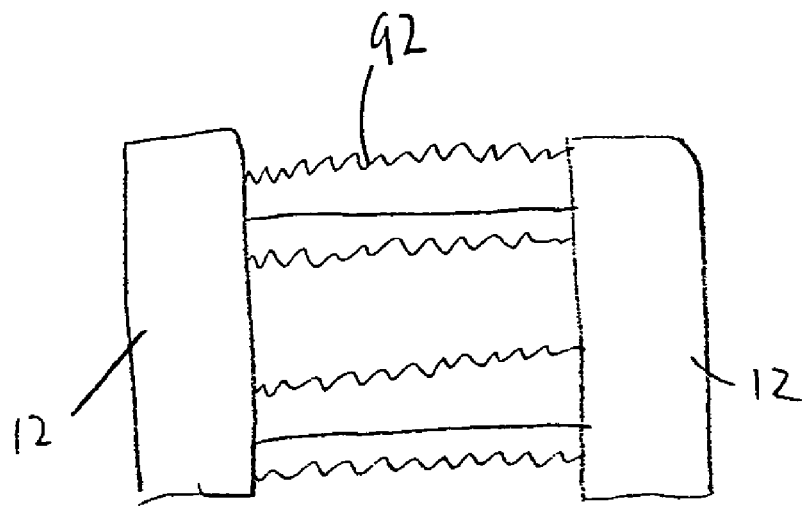
FIG. 12 is a schematic view of multiple springs disposed between two segments according to one embodiment of the present invention.

FIG. 11 and FIG. 12 are schematic views of another preferred embodiment of the present invention. As seen from FIGS. 1, 11 and 12, the crawler device includes springs between two adjacent segments 12 biasing the two adjacent segments apart. In one form, there is only one spring 90 disposed over the joint between the two adjacent segments (FIG. 11). In another form, there are multiple springs 92 disposed between and connected to the two adjacent segments (FIG. 12). When the crawler device is bent, the springs between the two adjacent segments bias the two segments apart, adding stiffness between the adjacent segments.

Figure 13:
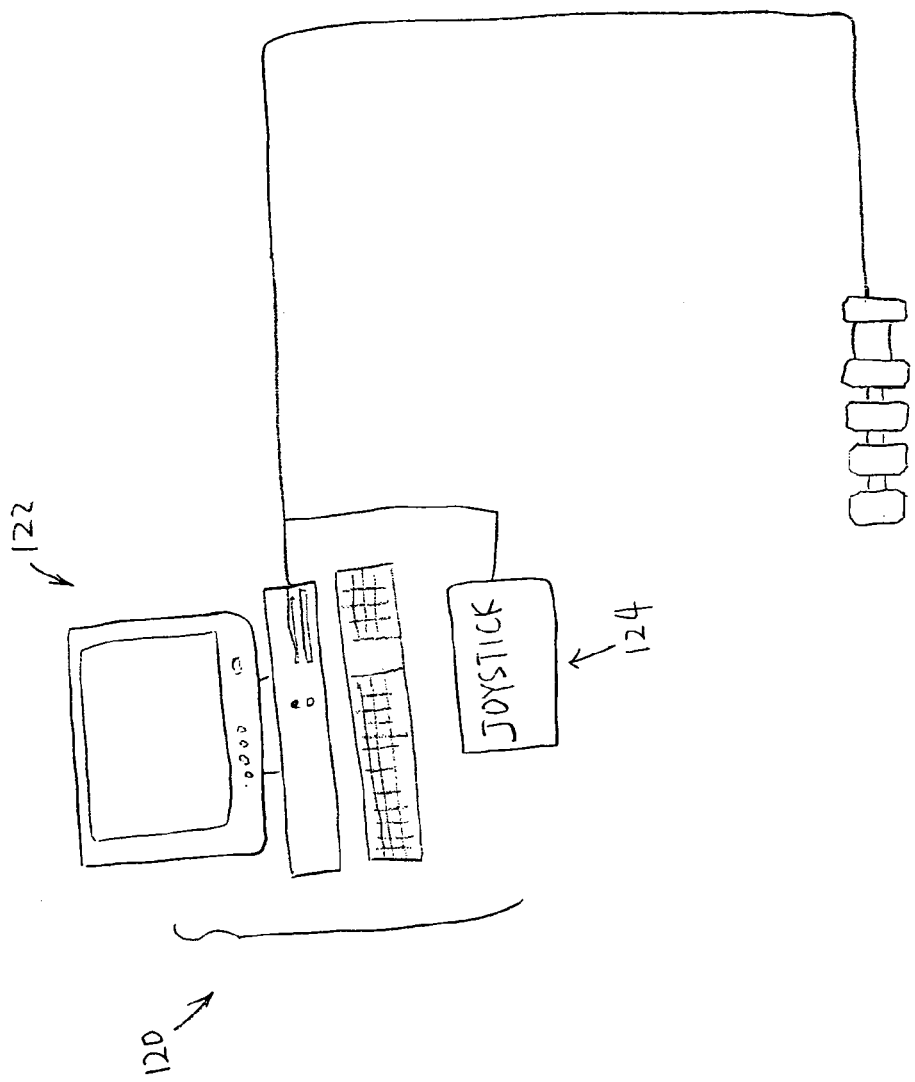
FIG. 13 is a schematic view of a control system connected to the crawler device according to one embodiment of the present invention.

Referring again to FIGS. 1, 2, 3 and 4, the crawler device 10 (10' and 10") further includes a video camera 110 at the head segment 70. Any type of small conventional video camera can be used. Remote control may be used to drive a motor in the video camera to allow selective remote control of the directional axis of the camera. A light assembly 112 is provided and mounted on the head segment 70. The light assembly 112 preferably includes LED lights. The video camera 110 and the light assembly 112 allow the operator to visually view the environment of the distal end of the crawler device, and for example, inspect the inside of rubble of a collapsed structure, so that the operator can search for victims in the rubble and also can steer the crawler device into desired directions, effecting image-guided operation. A control system 120 is connected to the crawler device for controlling the crawler device (FIG. 13). The control system 120 is connected to the video camera 110 and the motor 16 by an internal cable passing through the crawler device 10 and the tether 60. The control system includes a display 122, preferably a computer, and a control joystick 124. The computer 122 and the joystick 124 are programmed to display video images received from the video camera 110 and to control the motor 16, steering the crawler device into desired directions.

In one preferred embodiment, the crawler device 10 (or 10', 10") further includes an orientation sensor 126, preferable a gravity sensor. The orientation sensor 126 is connected to the control system 120, which includes processing system programmed to orientate images received from the video camera 110, and display the orientated images on the screen of the computer with an upright view suitable to be viewed by an operator based on signals received from the orientation sensor.

The crawler device 10 may further include microphone 128 and speaker 130 mounted on the head segment 70, and a corresponding speaker and a microphone disposed with the control system. The microphones and speakers allow an operator to communicate with a victim. In one preferred embodiment, the crawler device further includes infrared sensors, which, for example, are useful for searching for victims in the rubble of a collapsed structure. The crawler device may also carry biological and chemical sensors. The crawler device may also include a carrier adapted for carrying nutrients, medications, and etc. to victims.

Figure 14:
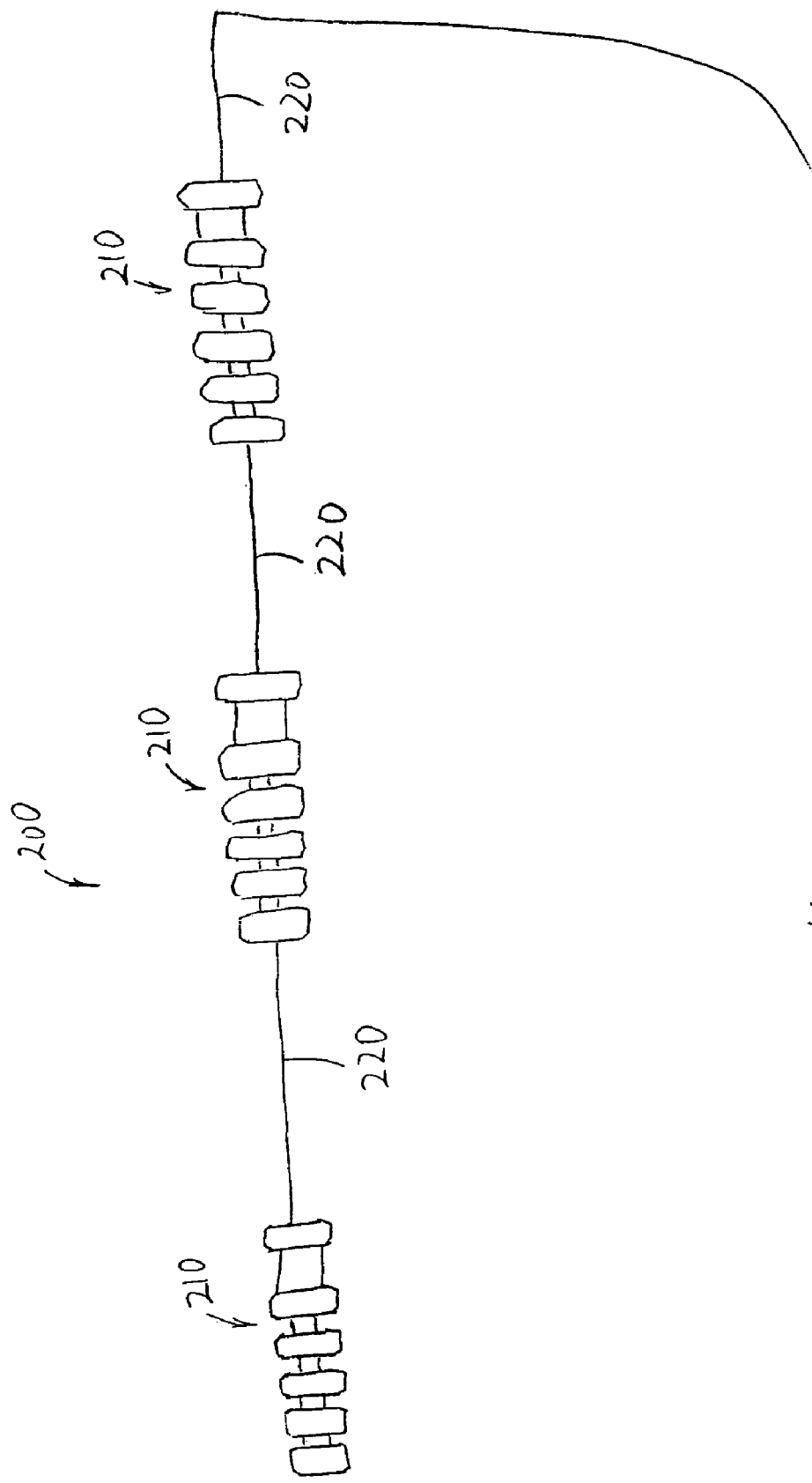
FIG. 14 is a schematic view of a crawler device having multiple crawler units connected by tethers according to one embodiment of the present invention.

FIG. 14 illustrates another crawler device 200 in accordance with the present invention. The crawler device 200 includes a plurality of crawler units 210 connected in serial by elongated tethers 220. Each crawler unit 210 has substantially the same structure as the crawler device 10 or 10' described above, including a unit motor, a common drive shaft, and a plurality wheeled segments disposed over the common drive shaft. Each crawler unit 210 is powered to be capable of dragging the tether connected behind the crawler unit. An electrical cable passes through all the tethers and the crawler units, supplying electrical power to all the crawler units. Cables for transmitting signals between crawler units and an external control system may also be embedded within the tethers and the crawler units. The multiple crawler units embodiment makes the crawler device capable of dragging a long tether, and makes it possible for the crawler device to go deeper into the rubble of collapsed structures or a pipe system.

While a number of specific components were described above for the preferred embodiments of the present invention, persons having ordinary skill in the art will readily recognize that other substitute components may be available now or in the future to accomplish comparable functions to the various components shown and described herein. For example, the crawler device may include a wireless communication system, instead of cables, transmitting signals between the motor, or the sensors and the control system. It is should be understood that the invention is not limited to the exact construction illustrated and described above, but that various changes and modifications may be made without departing from the spirit and scope of the invention as defined in the following claims.

What is claimed is:

1. A distributed traction crawler device comprising:
    an elongated flexible drive shaft extending along a central axis;
    a motor operatively connected to said drive shaft for rotating said drive shaft about said central axis;
    a plurality of segments disposed over said drive shaft between a proximal end and a distal end of the crawler device, each segment having a wheel assembly including at least one drive wheel, each of said drive wheels being rotatable about a wheel axis transverse to said central axis, wherein adjacent segments are joined to each other, and wherein at least two of the segments further include a drive coupling assembly operatively connecting the wheel assembly to the drive shaft, so that rotating the drive shaft provides distributed traction force to the drive wheels of said at least two segments.

2. A distributed traction crawler device according to claim 1, wherein said drive shaft includes successive sections joined by universal joints.

3. A distributed traction crawler device according to claim 1, wherein all the segments of said plurality of segments include said drive coupling assembly, so that rotating said drive shaft provides distributed traction force to the drive wheels of all the segments.

4. A distributed traction crawler device according to claim 1 further comprising at least one steering wire extending from a head segment which is located at the distal end of said crawler device, wherein said steering wire is substantially parallel with the drive shaft.

5. A distributed traction crawler device according to claim 4, wherein said at least one steering wire extends from the head segment to a steering end effector at the proximal end of said crawler device.

6. A distributed traction crawler device according to claim 5, wherein said steering end effector is a motor.

7. A distributed traction crawler device according to claim 4, wherein said at least one steering wire includes four steering wires for effecting two axes steering.

8. A distributed traction crawler device according to claim 7, wherein the four steering wires are equally spaced about the drive shaft.

9. A distributed traction crawler device according to claim 4, wherein said motor is located at or near the proximal end of said crawler device, and wherein said at least on steering wire extends to said motor.

10. A distributed traction crawler device according to claim 4 further comprising a tether extending between a user control end and a tether distal end, said tether distal end being connected to the proximal end of said crawler device, wherein said at least one steering wire extends from the head segment along the crawler device and the tether to the user control end.

11. A distributed traction crawler device according to claim 1 further comprising a tether extending between a user control end and a tether distal end, said tether distal end being connected to the proximal end of said crawler device.

12. A distributed traction crawler device according to claim 11, wherein said motor is positioned remote from said crawler device and is operatively coupled to said drive shaft by way of a drive cable extending along said tether.

13. A distributed traction crawler device according to claim 11 further comprising a tube extending from the distal end of the crawler device along the crawler device and the tether to a user control end.

14. A distributed traction crawler device according to claim 13, wherein the tube is adapted for transmitting air.

15. A distributed traction crawler device according to claim 13, wherein the tube is adapted for transmitting fluid.

16. A distributed traction crawler device according to claim 11, wherein said tether is semi-rigid.

17. A distributed traction crawler device according to claim 11 further comprising a cable for supplying power from an external source to said motor, said cable extending along said tether.

18. A distributed traction crawler device according to claim 1, further comprising a control system located at a remote position from said crawler device, and communication link means for transmitting control signals from said control system to said motor.

19. A distributed traction crawler device according to claim 18, wherein said control system includes a joystick.

20. A distributed traction crawler device according to claim 18, wherein said crawler device further includes a tether connected to the proximal end of said crawler device, wherein said communication link means includes a cable for transmitting control signals from said control system to said motor, and wherein said cable extends along said tether.

21. A distributed traction crawler device according to claim 1, wherein said motor is adapted to selectively rotate said drive shaft in clockwise and counterclockwise rotational motions.

22. A distributed traction crawler device according to claim 1, further comprising a video camera disposed on or near a head segment located at the distal end of said crawler device.

23. A distributed traction crawler device according to claim 22, wherein the camera is remotely steerable.

24. A distributed traction crawler device according to claim 22, further comprising a communication system transmitting signals from said video camera to an external video display system.

25. A distributed traction crawler device according to claim 24, wherein said crawler device further includes a tether extending from the proximal end of said crawler device to the display system, and wherein said communication system includes a cable extending along said crawler device and said tether for transmitting signals received by said video camera to the external video display system.

26. A distributed traction crawler device according to claim 22, further comprising an orientation sensor.

27. A distributed traction crawler device according to claim 26, wherein said orientation sensor is a gravity sensor.

28. A distributed traction crawler device according to claim 26, further comprising a processing system connected to said orientation sensor and programmed to orientate images received from said video camera and displayed on a display system to an upright view based upon signals received from the orientation sensor.

29. A distributed traction crawler device according to claim 1, further comprising a light assembly mounted on a head segment located at the distal end of said crawler device.

30. A distributed traction crawler device according to claim 1, further comprising a microphone mounted on a head segment located at the distal end of said crawler device.

31. A distributed traction crawler device according to claim 30, further comprising a speaker mounted on said head segment.

32. A distributed traction crawler device according to claim 31, further comprising a cable extending from said head segment to a user control end for transmitting signals bi-directionally between the microphone, the speaker, and an operator.

33. A distributed traction crawler device according to claim 1, wherein said wheel assembly of each segment comprises two sets of wheels disposed on opposite sides of said segment, each set including two drive wheels.

34. A distributed traction crawler device according to claim 1, wherein said wheel assembly of each segment comprises four sets of wheels disposed on four sides of said segment, each set including two drive wheels.

35. A distributed traction crawler device according to claim 1, wherein said at least one drive wheel of said wheel assembly of each segment has a substantial conical shape.

36. A distributed traction crawler device according to claim 1, wherein said at least one drive wheel of said wheel assembly of each segment includes circumferential tread patterns for traction.

37. A distributed traction crawler device according to claim 1, wherein said crawler device further comprises one spring between at least one set of adjacent segments biasing said adjacent segments apart.

38. A distributed traction crawler device according to claim 1, wherein said crawler device further comprises multiple springs between at least one set of adjacent segments, said multiple springs attached to and biasing the adjacent segments apart.

39. A distributed traction crawler device according to claim 1, wherein said crawler device further comprises a drive unit, said drive unit housing the motor.

40. A distributed traction crawler device according to claim 39, wherein said drive unit disposed at or near a proximal end of said drive shaft.

41. A distributed traction crawler device according to claim 40, wherein any two adjacent segments of said plurality of segments are joined by an articulated joint.

42. A distributed traction crawler device according to claim 39, wherein said drive unit is disposed between and joined to two segments of said plurality of segments.

43. A distributed traction crawler device according to claim 1, wherein adjacent segments of said plurality of segments are joined by articulated joints.

44. A distributed traction crawler device according to claim 1, wherein said motor is a hydraulic motor.

45. A distributed traction crawler device according to claim 1, wherein said motor is an electric motor.

46. A distributed traction crawler device according to claim 1, wherein said motor is a pneumatic motor.

47. A distributed traction crawler device according to claim 1, wherein said drive coupling assembly is a gear assembly.

48. A distributed traction crawler device according to claim 1 further comprising an infrared sensor.

49. A distributed traction crawler device comprising:
an elongated flexible drive shaft extending along a central axis between a proximal end and a distal end;
a drive unit disposed at the proximal end of said drive shaft, said drive unit housing a motor operatively connected to said drive shaft for rotating said drive shaft about said central axis;
a plurality of segments successively disposed over said drive shaft, each segment having a wheel assembly including at least one drive wheel, each of said drive wheels being rotatable about a wheel axis transverse to said central axis, wherein adjacent segments of said plurality of segments are joined by an articulated joint, and wherein at least two segments further include a drive coupling assembly operatively connecting the wheel assembly to the flexible drive shaft, so that rotating said drive shaft provides distributed traction to the drive wheels of said at least two segments; and at least one detecting means disposed on a head segment which is located at the distal end of said drive shaft.

50. A distributed traction crawler device according to claim 49 further comprising a communication system, said communication system providing a communication link between said at least one detecting means and an operator.

51. A distributed traction crawler device according to claim 50, wherein said communication system is adapted for providing two way communications.

52. A distributed traction crawler device according to claim 49 further comprising a tether connected to the drive unit.

53. A distributed traction crawler device according to claim 52 further comprising a cable for transmitting information between said at least one detecting means and a control system, said cable extending from said at least one detecting means to the control system.

54. A distributed traction crawler device according to claim 49, wherein said at least one detecting means includes a video camera.

55. A distributed traction crawler device according to claim 49, wherein said at least one detecting means includes a microphone.

56. A distributed traction crawler device according to claim 55 further comprising a speaker mounted on said head segment.

57. A distributed traction crawler device comprising:
a drive unit housing a motor;
an elongated flexible drive shaft extending along a central axis from a proximal end, through the drive unit, to a distal end, wherein said motor is operatively connected to said drive shaft for rotating said drive shaft about the central axis;
a plurality of segments disposed over said drive shaft, each segment having a wheel assembly including at least one drive wheel, each wheel is rotatable about a wheel axis transverse to the central axis, wherein two segments are disposed at two opposite ends of said drive unit, wherein any other adjacent segments are joined by an articulated joint, and wherein at least two segments further includes a drive coupling assembly operatively connecting the wheel assembly to the flexible drive shaft, so that rotating said drive shaft provides distributed traction force to the drive wheels of said at least two segments.

58. A distributed traction crawler device according to claim 57, wherein all the segments of said plurality of segments include said drive coupling assembly, so that rotating said drive shaft provides distributed traction force to the drive wheels of all the segments.

59. A distributed traction crawler device comprising:
at least two crawler units connected by an elongated tether, wherein each crawler unit comprising:
an elongated drive shaft extending along a central axis between a proximal end and a distal end;
a motor operatively connected to said drive shaft for rotating said drive shaft about the central axis;
a plurality of segments disposed over said drive shaft, each segment having a wheel assembly including at least one drive wheel, each drive wheel being rotatable about a wheel axis transverse to the central axis, wherein adjacent segments are joined to each other, and wherein at least two segments further includes a drive coupling assembly operatively connecting the wheel assembly to the drive shaft, so that rotating said drive shaft provides distributed traction to the drive wheels of said at least two segments.

60. A distributed traction crawler device according to claim 59, wherein all the segments of the at least two crawler units include the drive coupling assembly, so that rotating said drive shaft provides distributed traction to the drive wheels of all the segments.

* * * * *